Figure 4:
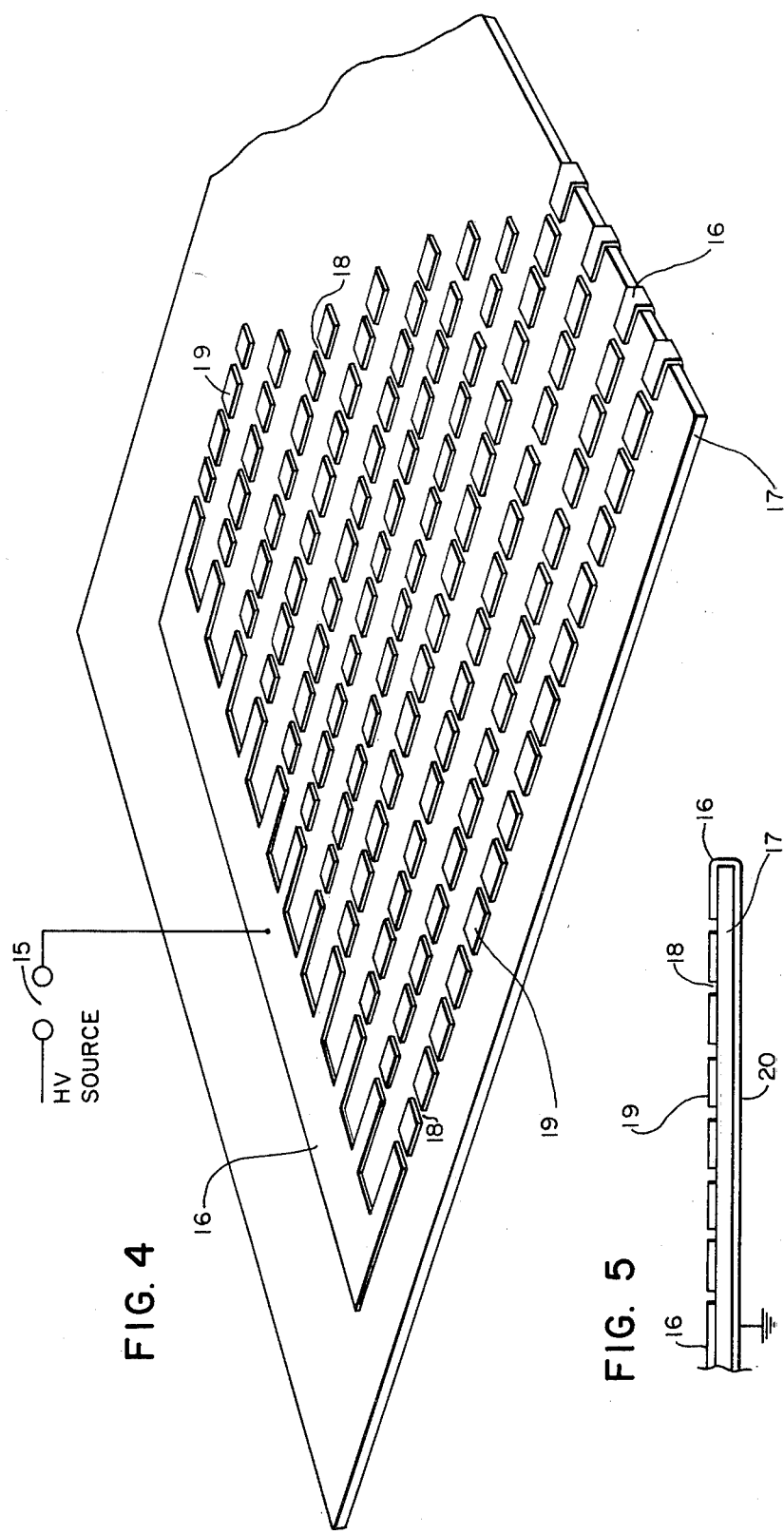

United States Patent [19]

Richardson et al.

[11] 4,041,414

[45] Aug. 9, 1977

[54] MULTIPLE ARC RADIATION PREIONIZER FOR GAS LASERS

[75] Inventors: Martin C. Richardson; Kurt Leopold, both of Ottawa, Canada

[73] Assignee: Canadian Patents and Development Limited, Ottawa, Canada

[21] Appl. No.: 453,517

[22] Filed: Mar. 21, 1974

[30] Foreign Application Priority Data

May 30, 1973 Canada .................................. 172712

[51] Int. Cl.² ............................................. H01S 3/097
[52] U.S. Cl. ........................ 331/94.5 G; 331/94.5 PE
[58] Field of Search ................. 331/94.5 G, 94.5 PE, 331/94.5 D; 313/198, 325, 329, 353, 131 R

[56] References Cited

U.S. PATENT DOCUMENTS

3,828,277  8/1974  Otto et al. .......................... 331/94.5

OTHER PUBLICATIONS

Seguin et al., Applied Physics Letters, vol. 21, No. 9, Nov. 1, 1972, pp. 414–415.
Vanyukov et al., Soviet Journal of Quantum Electronics, vol. 36, No. 3, May–June, 1969, pp. 322-324.

*Primary Examiner*—William L. Sikes
*Attorney, Agent, or Firm*—James R. Hughes

[57] ABSTRACT

A multiple arc radiation preionizer for gas lasers formed of a metal electrical conductor with the conductor having formed over a portion of its length, a series of gaps to form a series of intervening discharge electrodes such that on energization of the conductor, a multiplicity of arc discharges is obtained. In a first embodiment the conductor is formed or positioned over the surface of a dielectric sheet such that arcs formed between electrodes are conducted over the surface of the sheet. The discharge electrodes are capacitively connected to ground or the low voltage side of the input via individual low-valued capacitors or by means of a conductor positioned in spaced relation to said electrodes. In the preferred embodiment, the preionizer is formed of a multiplicity of parallel conductors mounted on a dielectric sheet with the conductors each having a multiplicity of gaps therein forming a series of discharge electrodes each of which is connected through a capacitance to ground or a common voltage level such that on energization of the conductors from a high voltage pulse source, a two-dimensional array of a large number of arc discharges is obtained.

4 Claims, 7 Drawing Figures

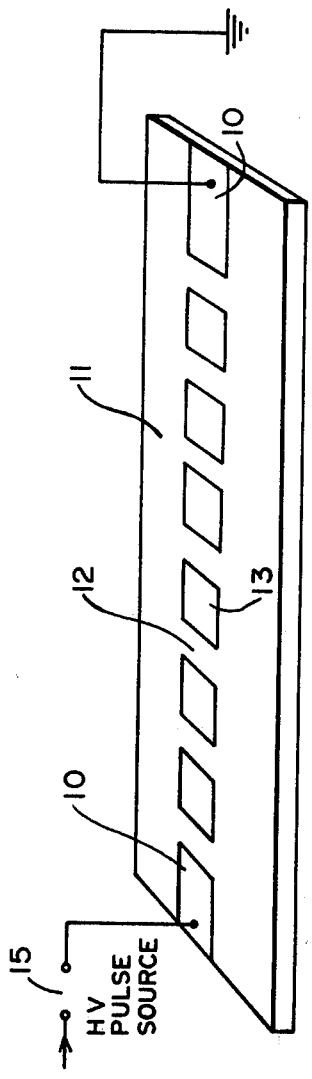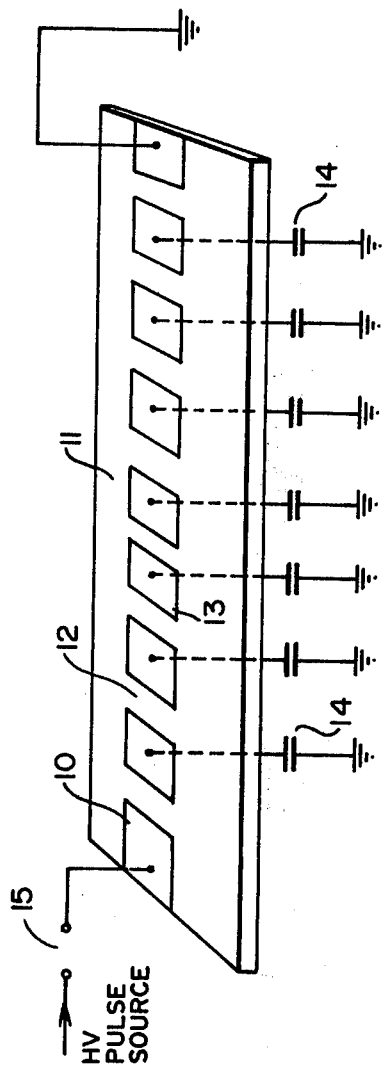

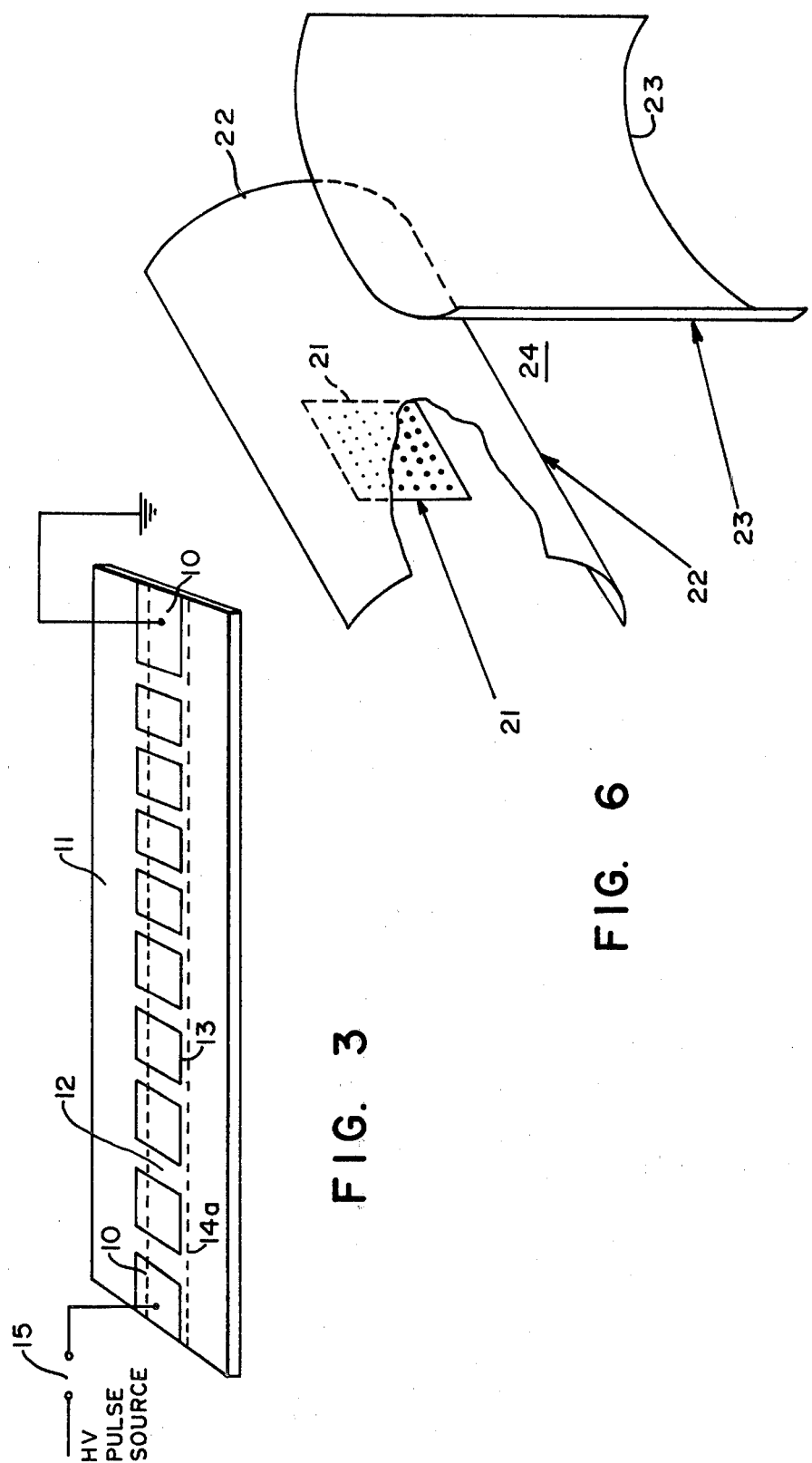

MULTIPLE ARC RADIATION PREIONIZER FOR GAS LASERS

This invention relates to gas lasers and more particularly to a multiple arc radiation source for preionizing high pressure laser gas discharges.

High pressures gas lasers are known and in widespread use. The foremost example of this type of laser is the transversely excited, atmospheric (TEA) carbon dioxide laser described in Canadian Pat. No. 898,874, dated May 9, 1972 with a double discharge excitation system for this type of laser described in U.S. Pat. No. 3,662,284 dated May 9, 1972.

It has been found that high-energy operation of transversely excited gas lasers may be achieved if volumetric photopreonization of the gas by short wavelength radiation is employed. This radiation which is obtained from arc discharges produces electro-ion pairs within the gas volume by photoionization. If a uniform degree of ionization between the main discharge electrodes can be obtained then this will facilitate the production of high energy uniform discharge through large volumes of high pressure gas without the formation of constricted arcs between the main electrodes.

Present methods of illuminating volumes of laser gas with the radiation from arc discharges utilize various arrangements of single arcs between point electrodes. In a paper entitled "A High Power Tea $CO_2$ Laser" by M. C. Richardson, A. J. Alcock, K. Leopold and P. Burtyn published in Laval University, Quebec, Canada, on May 15-17-1972, the authors describe various illumination methods. In a paper entitled "Photoinitiated and Photosustained Laser" by H. Seguin and J. Tulip, published in Applied Physics Letters, Vol 21, No. 9, 1 November 1972, the authors describe a system using arcs of flashlamps situated behind a perforated electrode. In a paper entitled "An Efficient Electrical $CO_2$ Laser Using Preionization by Ultraviolet Radiation" by O. P. Judd, published in Applied Physics Letters, Vol. 22, No. 3, 1 February 1973, the author describes a system employing individually resistively loaded discharges. In a paper entitled "A 300-J Multigigawatt $CO_2$ Laser" by M. C. Richardson, A. J. Alcock, Kurt Leopold and Peter Burtyn, published in the IEEE Journal of Quantum Electronics, Vol. QE-9, No. 2, February 1973, the authors describe a system using a large number of parallel arcs from small point electrodes to a common, semitransparent mesh electrode. The configurations described in these publications work well to a certain degree but do not provide the necessary illumination of the large volume to give the highest efficiency laser output. Insufficient energy is dissipated in the arcs to provide adequate illumination of large volumes of laser gas mixtures. It is pointed out that the photoionization effects of ultra-violet radiation were observed very early in this century.

It is an object of the present invention to provide a multiple arc radiation source that is capable of efficiently illuminating, for purposes of preionization, volumes of gas in gas lasers.

It is another object of the invention to provide a laser preionizer that is simple to manufacture and which can be readily fabricated in any desired shape.

It is another object of the invention to provide a laser preionizer that produces a large number of arcs uniformly distributed over the illumination area.

These and other objects of the invention are achieved by a preionizer formed of a metal electrical conductor with the conductor having formed over a portion of its length, a series of gaps to form a series of intervening discharge electrodes such that an energization of the conductor, a multiplicity of arc discharges is obtained. In a first embodiment the conductor is formed or positioned over the surface of a dielectric sheet such that arcs formed between electrodes are conducted over the surface of the sheet with the discharge electrodes being capacitively connected to ground or the low voltage side of the input via individual low-valued capacitors or by means of a conductor positioned in spaced relation to said electrodes. In the preferred embodiment, the preionizer is formed of a multiplicity of parallel conductors mounted on a dielectric sheet with the conductors having a multiplicity of gaps therein forming a series of discharge electrodes each of which is connected through a capacitance to ground or a common voltage level such that on energization of the conductors from a high voltage pulse source, a two-dimensional array of a large number of arc discharges is obtained.

Figure 5:
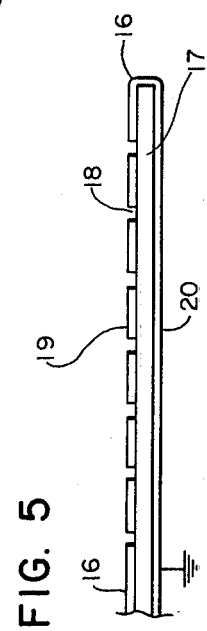
Figure 7:
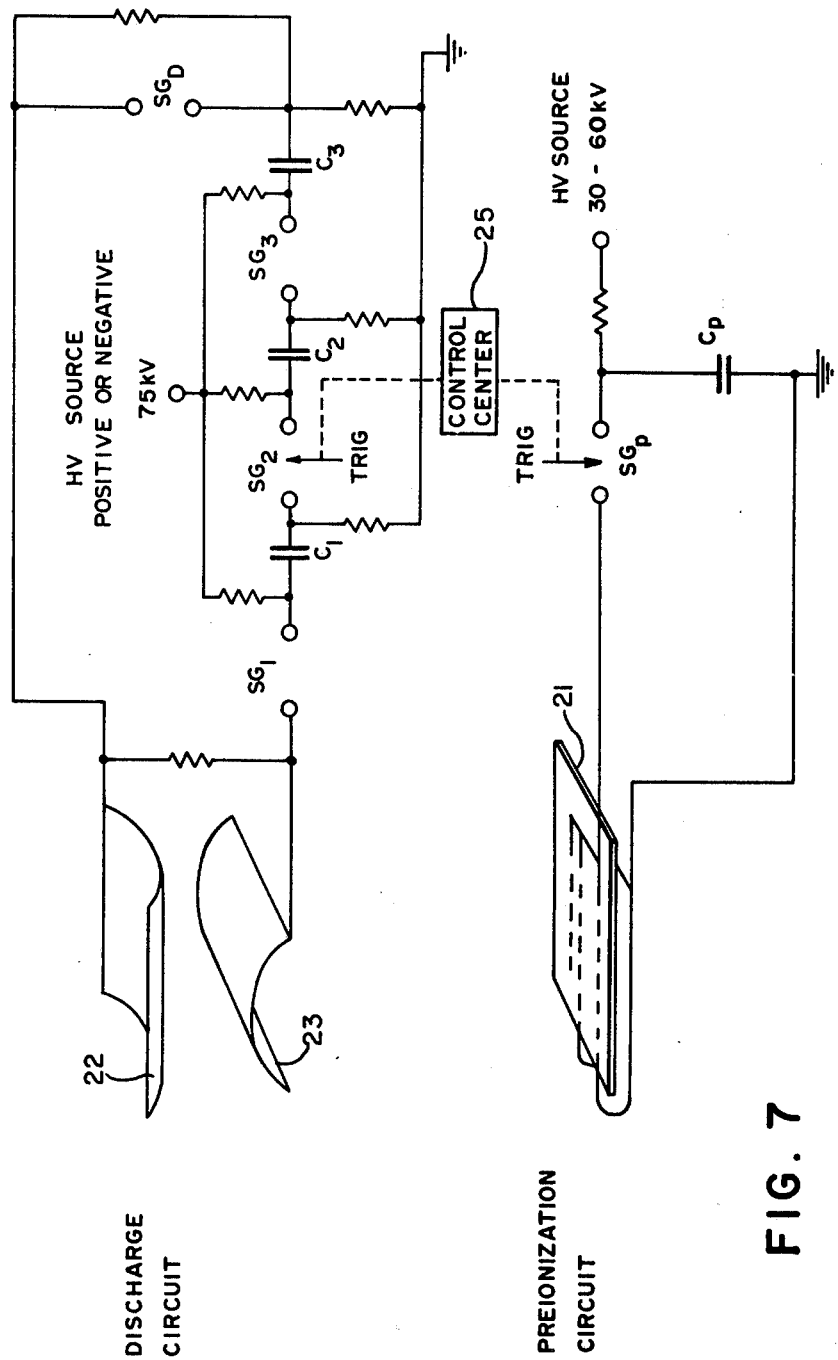

In drawings which illustrate an embodiment of the invention,

FIG. 1 is a schematic of a single linear array preionizer,

FIG. 2 is a schematic of a single linear array preionizer with individual capacitive connection of the discharge electrodes to ground, FIG. 3 is a view of single linear array with low inductance ground plane, FIG. 4 is a schematic of a preionizer multiple discharge spark gap array, FIG. 5 is a partial cross-section of the FIG. 4 array, FIG. 6 shows the multiple spark preionizer positioned in relation to the main laser electrodes, FIG. 7 shows a complete preionization circuit in relation to the laser discharge circuit.

Referring to FIG. 1 a preionizer array is made up of a generally flat metal conductor 10 positioned or formed on a thin supporting sheet or board 11. Gaps 12 are formed in these conductors leaving a series of individual discharge electrodes 13 such as to give a line array of spark gap positions. Suitable materials for the conductors and electrodes are tungsten, stainless steel, steel, copper or other conducting metals. The supporting sheet should be made of a dielectric material such as ceramic, glass, fiberglass, or other high voltage characteristic material. The conductor is connected to a high voltage pulse source (capacitor) triggered by a spark gap 15. Other switching devices for high voltages may be used e.g. thyratron. It has been found that on energization that arcs simultaneously appear in the gaps and these extend between electrodes over the surface of the dielectric sheet. The dielectric acts to assist in the arc conduction between electrodes giving broadened, more stable arcs.

FIG. 2 shows a device similar to that of FIG. 1 but in this case each of the discharge electrodes is individually connected via 1 pf. to 500 pf, capacitors 14 to ground or the low side of the input.

FIG. 3 is an alternative arrangement with a low inductance ground plane conductor 14a positioned below sheet 11 and in spaced relation to electrodes 13. This is connected to ground.

FIG. 4 and 5 shows a preionizer array made up of a number of flat parallel conductors 16 positioned or formed on a thin supporting sheet or board 17. Gaps 18 are formed in these conductors leaving a series of intervening individual discharge electrodes 19 such as to give a two-dimensional array of spark gap positions. FIG. 5 indicates that conductors 16 are brought around the edge of the board and continue underneath as continuous ground plane conductor 20 connected to ground.

A typical arrangement that has been built and tested consisted of a discharge array 20 × 30 cm. in area and made up of approximately 160 arcs distributed over a surface area of about 600 cm². The device was made from a doublecoated fiberglass amalgam electronic circuit board with the gaps removed by etching. Other materials may be used for this purpose e.g. stainless steel conductors and electrodes on a glass sheet. The width of each arc electrode was approximately 4 mm. and the arc distance approximately 3mm. The energy dissipated in each row of areas was 2–6 joules provided by switching a low inductance (20nH) high voltage (30–60 kV) 0.1 μF capacitor with a triggered spark gap.

FIG. 6 shows the placement of a multiple spark preionizer 21 behind one of the main electrodes 22 of a gas laser. Electrode 22 and electrode 23 define a main laser discharge region (24) between them with the preionizer positioned to illuminate and preionize this discharge region by photoionization. It is considered that this action is due to the UV radiation from the array of arcs. For this configuration the electrode 22 at least has to be in the form of an open mesh grid or a perforated sheet to allow passage of the UV radiation from the preionizer into the discharge region. A typical structure would be a perforated steel sheet. It will be realized that various configurations of main electrodes and preionizer are possible. If the electrodes are solid metal structures then the prieonizer could be placed to illuminate the discharge region from a side position. In fact more than one preionizer structure could be used for some applications.

FIG. 7 shows the main electrodes 22 and 23 and the preionizer structure 21 positioned in relation to each other and connected to typical energization sources. A Marx bank excitation circuit energized from a HV source, e.g. 75 KV, made up of storage capacitors $C_1$, $C_2$, $C_3$ and trigger sparks gaps $SG_1$, $SG_2$, $SG_3$ and an auxilliary spark gap $SG_D$, connected to one electrode (cathode) will initiate the main discharge on triggering of one of the spark gaps ($SG_2$). The preionizer is connected to a power source, e.g. 30–60 kV, via a storage capacitor $C_p$, and a triggering spark gap $SG_P$. This trigger is connected in timed, ganged relation to $SG_2$ via control center 25 such that the preionization is initiated slightly ahead of the main discharge. It has been found that by using the type of preionizer described above that this timing is not extremely critical. It will be realized of course that other types of firing and control circuits may be used.

We claim:

1. A multiple arc radiation preionizer for gas lasers of the type having two main electrodes defining a main laser discharge region between them comprising:
   a. a sheet of dielectric material,
   b. an elongated metallic conductor positioned over the surface of the sheet,
   c. said conductor having formed over a portion of its length a series of gaps to form a series of intervening discharge electrodes and thus an overall linear array of arc gap positions,
   d. said conductor having end connections such that on connection to a high voltage source, simultaneous arcs producing ultra violet radiation are formed between said discharge electrodes over the surface of the dielectric sheet, and
   e. a metal conductor positioned on said sheet in spaced relation to said electrodes to form a low inductance ground plane, said conductor being connected to one of said end connections or to ground.

2. A multiple arc radiation preionizer for gas lasers as in claim 1 wherein the dielectric sheet is made of a material of the group: glass, fiberglass, ceramic.

3. A multiple arc radiation preionizer for gas lasers of the type having two main electrodes defining a main laser discharge region between them comprising:
   a. a sheet of dielectric material,
   b. a multiplicity of metallic, generally parallel conductors positioned over the surface of the sheet,
   c. each of said conductors having formed over a portion of its length, a series of gaps to form a series of intervening discharge electrodes and thus an overall two dimensional array of arc gap positions, said conductors being connected together at their ends in electrical parallel relationship such that on connection to a high voltage source, simultaneous arcs are formed between said discharge electrodes over the surface of the dielectric sheet, and
   d. a metal conducting sheet positioned on the dielectric sheet on the surface away from and in spaced relation to said discharge electrodes, said sheet being connected to ground or to one end of said conductors.

4. A high power transversely excited, gas laser of the type having two main electrode structures positioned in the laser cavity connected to a high voltage pulse source and defining a volume discharge region between them, the improvement comprising a preionizer structure formed of a sheet of dielectric material, a multiplicity of metal, generally parallel conductors positioned over the surface of said sheet and connected at their ends in electrical parallel to a high voltage pulse source, each of said conductors including a series of gaps defining intervening discharge electrodes and an overall two dimensional array of arc gap positions, said preionizer structure being positioned in the laser cavity adjacent said main electrodes such that on energization, the array of radiation arcs illuminates and photoionizes by ultra violet radiation the volume of laser gas between electrodes, wherein one of the main electrodes is a perforated metal sheet and, the preionizer structure is positioned behind said electrode, and a series of metal conductors positioned on the dielectric sheet on the surface away from and in spaced relation to said discharge electrodes and defining a low inductance ground plane for said electrodes.

* * * * *